(12) United States Patent
Jungert et al.

(10) Patent No.: US 8,187,516 B2
(45) Date of Patent: May 29, 2012

(54) METHOD OF PRODUCING A BENT ROD AND ROD

(75) Inventors: Dieter Jungert, Weissach (DE);
Sebastiaan Wijskamp, Enschede (NL);
Gerard Nijman, Losser (NL);
Karl-Heinrich Latzsch, Kohren-Sahlis (DE)

(73) Assignees: Dr. Ing. h.c.F. Porsche, Aktiengesellschaft (DE); Vredestein, Banden Bv (NL); Latzsch GmbH Kunststoffverarbeltung (DE)

( * ) Notice: Subject to any disclaimer, the term of this patent is extended or adjusted under 35 U.S.C. 154(b) by 385 days.

(21) Appl. No.: 12/508,822

(22) Filed: Jul. 24, 2009

(65) Prior Publication Data
US 2010/0028673 A1 Feb. 4, 2010

(30) Foreign Application Priority Data
Aug. 2, 2008 (DE) .................... 10 2008 036 241

(51) Int. Cl.
*B29C 53/00* (2006.01)
(52) U.S. Cl. ........ 264/295; 264/136; 264/137; 264/236; 264/339; 264/496
(58) Field of Classification Search .................. 264/136, 264/137, 236, 295, 339, 496
See application file for complete search history.

(56) References Cited

U.S. PATENT DOCUMENTS

| | | | | |
|---|---|---|---|---|
| 5,470,517 A | * | 11/1995 | Conley | 264/137 |
| 7,452,585 B1 | * | 11/2008 | Wong et al. | 428/117 |
| 2005/0064170 A1 | * | 3/2005 | Gopal et al. | 428/297.4 |

FOREIGN PATENT DOCUMENTS
DE 44 18 809 A1 12/1995
* cited by examiner

*Primary Examiner* — Christina Johnson
*Assistant Examiner* — Saeed Huda
(74) *Attorney, Agent, or Firm* — Gerald E. Hespos; Michael J. Porco

(57) ABSTRACT

A method of producing a bent rod includes impregnating fibers (1) with resin (2), introducing the impregnated fibers into a flexible plastic tube (3), bringing the flexible plastic tube to a desired bent form and crosslinking the resin with the fibers to produce the rod with the desired bent shape. The flexible plastic tube is formed from a material that has a very low friction coefficient and the flexible plastic tube remains in its position after the crosslinking to permit sliding movement of the bent rod relative to an adjacent structure.

18 Claims, 1 Drawing Sheet

METHOD OF PRODUCING A BENT ROD AND ROD

This application claims priority under 35 USC 119 to German Patent Application No. 10 2008 036 241.7-16 filed on Aug. 2, 2008, the entire disclosure of which is incorporated herein by reference.

BACKGROUND OF THE INVENTION

1. Field of the Invention

The invention relates to a method of producing a curved rod and a rod produced by the method.

2. Description of the Related Art

Fiber reinforced rods have been used for stiffening flexible structures. These rods are produced by impregnating fibers, for example glass fibers, with resin, such as polyester resin. A lighter and more stable rod is obtained after curing, i.e. after the fibers have been crosslinked with the resin. Fiber reinforced rods usually are straight. Stresses occur if such a straight rod is employed in a structure in which the rod is held in a constantly curved state. Accordingly, the bearings for holding the rod in its curved position may suffer fatigue. There has been a proposal to grind the surface of the rod at certain locations to influence the form of a desired bend. This constriction prevents fatigue of the bearings, but requires great subsequent working effort and weakens the fibers of the rod.

U.S. Pat. No. 5,470,517 generically discloses a method of producing a curved rod in which the curing, i.e. the crosslinkage of the resin with the fibers, is performed while the rod is bent as desired. The fibers of the bent rod produced by the method are not weakened by subsequent constriction and the rod does not induce any effects of fatigue at its bearings.

A bent rod made by the method generically disclosed in U.S. Pat. No. 5,470,517 represents a usable solution for various application areas. However, the rod bent by the method disclosed generically in U.S. Pat. No. 5,470,517 continues to have disadvantages in certain cases. More particularly, continual relative movements may take place between the above-described rod and a structure stiffened by the rod. This movement creates problems of friction between the hard rod and the flexible material surrounding it, for example rubber. This situation may arise in the stiffening of a flexible air ducting device of a motor vehicle, which is intended to change its form according to the driving situation of the motor vehicle, and which is subjected to the continual movements of the motor vehicle. To achieve bent rods that are adapted to such harsh operating conditions, it has already been proposed to provide the rod with a nonstick coating or to wind a high-grade steel spiral around the rod. However, the nonstick coating peels off under the harsh operating conditions and the high-grade steel spiral represents a relatively complex solution. Hence, there is a need for improvements to bent fiber reinforce rods. Consequently, an object of the invention is to provide a rod that avoids the problems mentioned above.

SUMMARY OF THE INVENTION

The invention relates to a curved rod that comprises fibers and resin disposed in a means for permitting sliding of the curved rod relative to a structure supported by the curved rod. The invention also relates to a method for producing such a curved rod. The means for permitting sliding of the curved rod relative to a structure supported by the curved rod preferably comprises a flexible plastic tube into which the fibers and the resin are introduced. The flexible plastic tube preferably is produced from a material with a very low friction coefficient (coefficient of friction). The method includes introducing the fibers and the resin into the flexible tube and then crosslinking the resin with the fibers. The flexible plastic tube remains in its position and functions as a means for permitting sliding movement of the bent rod relative to a structure supported by the rod. The ability to permit sliding movement is particularly important when the bent rod is used to support a structure in a high vibration environment, such as flexible (e.g. rubber) air duct in an automotive vehicle. The invention is based on the surprising finding that the flexible plastic tube used for producing the bent rod also can function as the sliding means for permitting sliding movement of the bent rod relative to the structure supported by the rod. The plastic tube must be formed to allow the crosslinkage between the resin and the fibers (pultrusion), while still providing appropriate sliding friction in the cured state. More particularly, the flexible plastic tube has a dual function, in that it provides a form for the pultrusion, but is not removed after completion of the bent rod and remains in position to perform the function of the sliding means. The use of such a specifically configured flexible plastic tube does not require any further modifications in the pultrusion process, but dispenses with the need for extensive reworking of the hard rod to provide a sliding means. Rather, the flexible plastic tube or other such form in which the bent rod is produced or cured already represents the sliding means. This provides a low-cost dual use of the flexible plastic tube in the production of the round or angular rod that is bent into a desired shape.

The flexible plastic tube preferably is formed from PTFE or plastic with admixed graphite. Both materials produce a bent rod with a surface that has a very low friction coefficient. A very low friction coefficient is to be understood here as meaning a value of less than 0.1 and, in particular, of less than 0.05 sliding friction over high-grade steel in a dry state. The type of crosslinkage between the resin and the fibers must be taken into account when choosing the material for the flexible plastic tube. The flexible plastic tube must be translucent in the case of crosslinkage by light, for example UV light,. For example, the flexible plastic tube must be produced from a low friction translucent material, such as PTFE, if crosslinkage by light is intended to take place in the production of the bent rod. A flexible plastic tube of a non-translucent material, such as plastic with admixed graphite, may be used instead of PTFE if crosslinkage of the resin with the fibers by peroxide or by heat is provided in the production process,. These statements also apply analogously to other types of crosslinkage between the resin and the fibers. The materials and processes mentioned above are intended only as examples and do not represent any restriction.

The fibers preferably are glass fibers and the resin preferably is a polyester resin. The tried-and-tested structure of a fiber-reinforced thermoset is obtained. Of course, other fibers, for example aramid or carbon fibers, and/or other resins, for example epoxy resin, are also possible. It would therefore also be possible, for example, to create a fiber-reinforced thermoplastic bent rod.

The process producing the bent or curved rod may be continuous or discontinuous. In the case of continuous processes, cutting to length takes place after pultrusion has taken place, i.e. after the crosslinkage of the resin with the fibers. In this case, the ready-cured rod, that is to say the resin crosslinked with the fibers, is cut to the desired length, for example sawn, together with the surrounding flexible plastic tube. In the case of discontinuous processes, the flexible plastic tube already is provided approximately in the desired length of the bent rod and is filled with corresponding fibers and resin. The flexible plastic tube, filled with the resin-impregnated fibers, then is placed in a template that has the desired contour of the bent rod. After curing, the finished rod has the desired bent shape and is removed from the contour defined by the template. In both cases, the flexible plastic tube remains on the rod that has the desired bent shape to function as the sliding means.

The bent rod preferably is formed by pulforming. Pulforming is a mixture of pultrusion and compression molding in which the fibers and the resin are placed in a mold together with the flexible plastic tube. The crosslinkage or curing then takes place in the mold, to which pressure also may be applied.

It has been found that rods with a diameter of about two to seven millimeters and preferably five millimeters—in each case without the flexible plastic tube—are dimensioned adequately for the stiffening of flexible structures, such as for example a flexible air ducting device of a motor vehicle. A flexible plastic tube with a wall thickness of one millimeter has been used successfully. These values apply for bent rods with a length of approximately two meters.

The bent rod is provided movably in the structure to be stiffened, and preferably has a diameter or an edge structure that is the same over its length. As a result the bent tube can be guided easily into the flexible structure to be stiffened. Measures must be taken to ensure the exact positional determination of the bent rod. This is made possible in a simple manner by providing a magnet in at least one end region of the bent rod. The magnet preferably is embedded in an injection-molded part that is screwed or adhesively attached to the bent rod. An exact determination of the position of the bent rod is then possible by sensing the position of the magnet by a position sensor in the flexible structure to be stiffened.

The invention now is described in detail with reference to the drawings.

DETAILED DESCRIPTION OF THE PREFERRED EMBODIMENT

Figure 1:
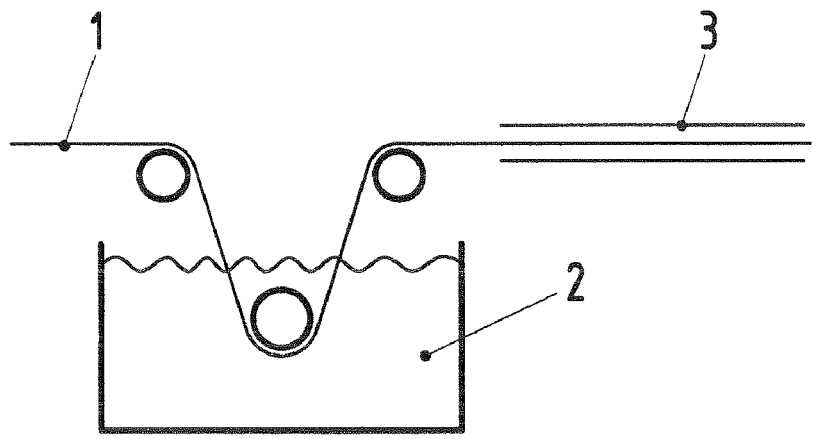
FIG. 1 schematically shows a method according to the invention.
Figure 2:
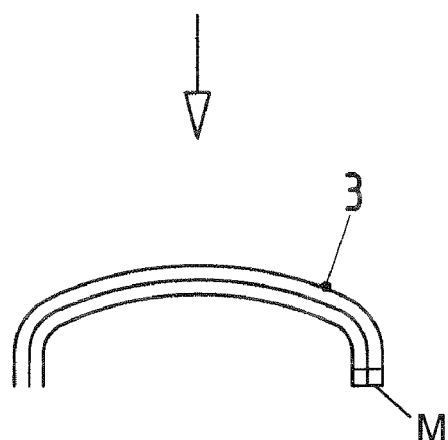
FIG. 2 is a schematic illustration of the bent rod.

A method for producing a bent rod in accordance with the invention is illustrated schematically in the FIG. 1. A first step of the method includes impregnating glass fibers 1 with a polyester resin 2. For this purpose, the glass fibers 1 are pulled through a corresponding bath of the polyester resin 2 so that the surface of the glass fibers is wetted with the polymer resin 2. The glass fibers 1 wetted in this way then are pulled into a flexible plastic tube 3 that is approximately of the same length as the rod bent as desired. The flexible plastic tube 3 is produced from PTFE (polytetrafluoroethylene). Consequently the flexible plastic tube 3 has a very low friction coefficient and is also translucent.

Figure 3:
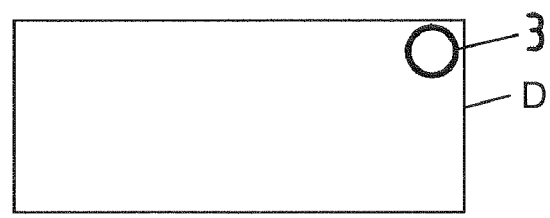
FIG. 3 is a cross-sectional view shown the bent rod in an air duct.

The method proceeds by placing the flexible plastic tube 3 in a template together with the resin-wetted glass fibers 1 contained in the flexible plastic tube. The template has the desired contour of the bent rod R. The polyester resin 2 located in the flexible plastic tube 3 of PTFE then is crosslinked with the glass fibers 1 by means of ultraviolet light. The template assures that the flexible plastic tube 3 has the desired bent contour. As a result, the crosslinkage takes place in this desired contour. Consequently, the finished rod R also has the desired bent contour after completion of the crosslinkage. Once crosslinkage (pultrusion) has taken place, which is determined for example by a corresponding time period, the ultraviolet light is switched off or the rod R is removed from the contour to obtain the rod R with the desired bent contour. The form, i.e. the flexible plastic tube 3, remains in position. The flexible plastic tube 3 is produced from PTFE, and hence has a very low friction coefficient. Therefore, the rod R with the desired bent shape can be arranged in an easily displaceable manner in a flexible structure to be stiffened, for example a flexible air ducting device of an automotive vehicle, as indicated by the letter D in FIG. 3. The ducting D is made e.g. of rubber. The PTFE of the flexible plastic tube 3 permits relative movement between the bent rod R and flexible ducting D in response to vibration of the motor vehicle without causing significant wear of the bent rod R or the ducting D. Of course, this is extremely helpful when the combination of the bent rod R used in combination with any flexible structure to be stiffened and intended for use in an environment that is subject to vibration or other such movement.

The bent rod R is provided movably in the ducting D to be stiffened, and preferably has a diameter or an edge structure that is the same over its length. As a result the bent tube 3 can be guided easily into the ducting D. Measures must be taken to ensure the exact position of the bent rod R in the ducting D. Accordingly, a magnet M is provided in at least one end region of the bent rod R. The magnet M preferably is embedded in an injection-molded part that is screwed or adhesively attached to the bent rod R. An exact determination of the position of the bent rod R in the ducting D is then possible by sensing the position of the magnet M by a position sensor in or near the ducting D.

What is claimed is:

1. A method of producing a bent rod for stiffening a hollow flexible structure of a motor vehicle, comprising:
   impregnating fibers with resin;
   introducing the impregnated fibers into a flexible plastic tube;
   bringing the flexible plastic tube with the impregnated fibers therein into to a desired bent form;
   crosslinking the resin with the fibers to obtain the bent rod with the desired bent form after the crosslinking; and
   inserting the bent rod into the hollow flexible structure for stiffening the hollow flexible structure,
   wherein the flexible plastic tube is formed from a material that has a very low friction coefficient and the flexible plastic tube remains in position after the crosslinking so that the bent rod slides easily relative to the hollow flexible structure in response to vibration of the motor vehicle.

2. The method of claim 1, wherein the flexible plastic tube has a friction coefficient of less than 0.1 over high-grade steel in a dry state.

3. The method of claim 2, wherein the flexible plastic tube has a friction coefficient of less than 0.05 over high-grade steel in a dry state.

4. The method of claim 1, wherein the flexible plastic tube is produced from PTFE.

5. The method of claim 1, wherein the flexible plastic tube contains graphite.

6. The method of claim 1, wherein the step of crosslinking is carried out by peroxide.

7. The method of claim 1, wherein the step of crosslinking is carried out by light.

8. The method of claim 7, wherein the step of crosslinking is carried out with UV light.

9. The method of claim 1, wherein the step of crosslinking is carried out by heat.

10. The method of claim 1, wherein the fibers are glass fibers.

11. The method of claim 1, wherein the resin is a polyester resin.

12. The method of claim 1, wherein the rod has a diameter of between two and seven millimeters without the flexible plastic tube.

13. The method of claim 12, wherein the rod has a diameter of approximately three to five millimeters without the flexible plastic tube.

14. The method of claim 1, wherein the bent rod is produced by a pulforming process.

15. The method of claim 1, wherein the hollow flexible structure is a flexible air ducting device of a motor vehicle, and wherein the step of inserting the bent rod into the hollow flexible structure is carried out for stiffening the air ducting device.

16. A method for producing a bent rod, comprising:
impregnating fibers with resin;
introducing the impregnated fibers into a flexible plastic tube formed from a material that has a very low friction coefficient;
bringing the flexible plastic tube with the impregnated fibers therein into to a desired bent form;
crosslinking the resin with the fibers to obtain the bent rod with the desired bent form after the crosslinking and with the flexible plastic tube remaining in position after the crosslinking; and
providing a magnet in at least one end region of the rod, for determining a position of the rod.

17. A method for stiffening a flexible air ducting device of a motor vehicle, the method comprising:
impregnating glass fibers with resin;
disposing the impregnated glass fibers within a plastic tube formed from PTFE or plastic admixed with graphite to obtain a coefficient of friction of less than 0.1 over high-grade steel in a dry state;
bending the flexible plastic tube with the impregnated fibers therein into a desired bent form;
crosslinking the resin with the fibers while the tube is bent; and
disposing the bent tube in the air ducting device,
whereby the tube permits sliding movement of the bent rod relative to the air ducting device in response to vibration and movement of the motor vehicle.

18. The method of claim 16, wherein the step of providing a magnet in at least one end region of the rod comprises providing a magnet embedded in an injection molded part and screwing or adhesively attaching the injection molded part to the bent rod.

* * * * *